Patented May 16, 1950

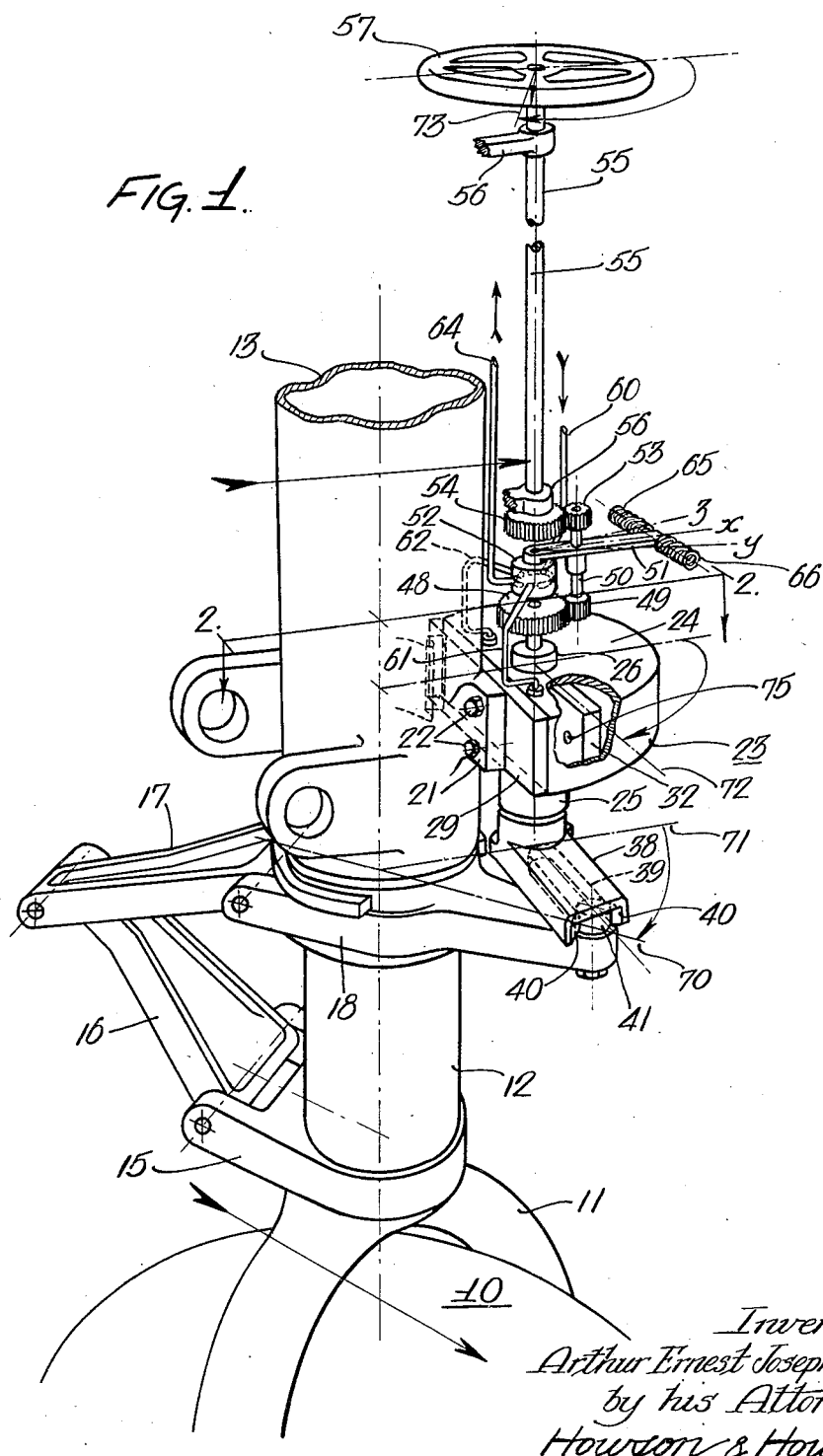

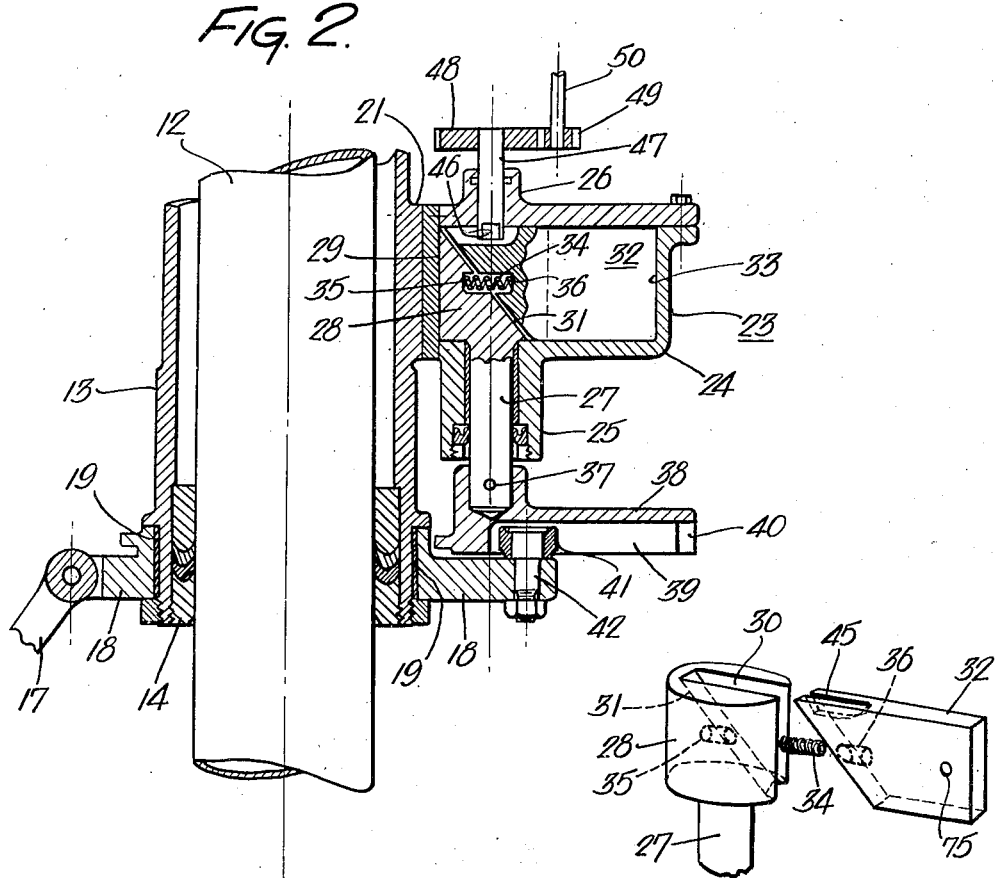
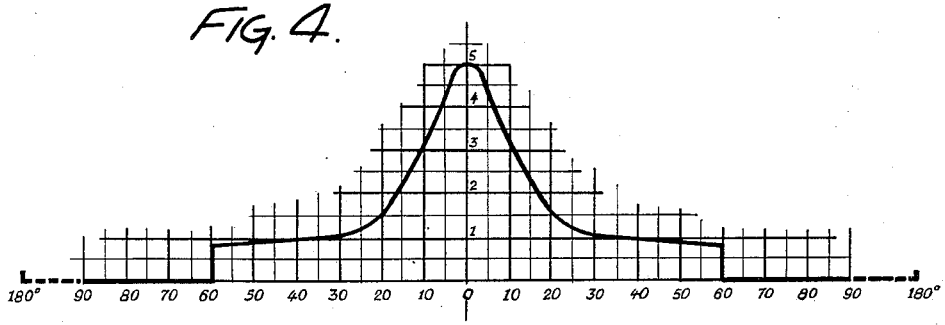

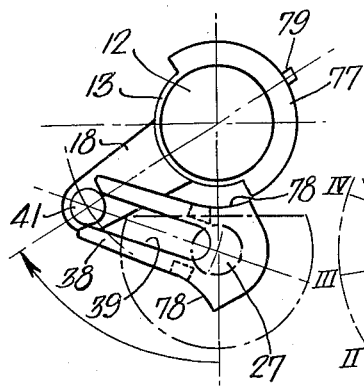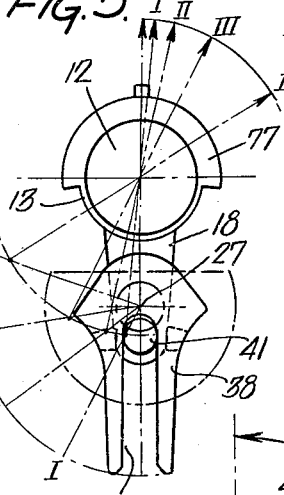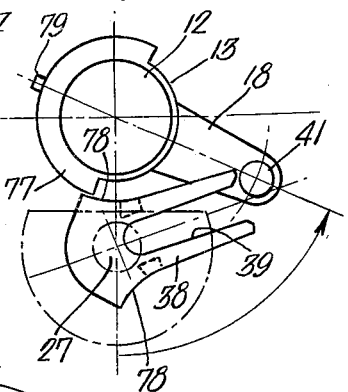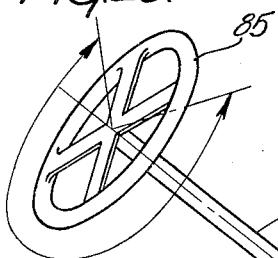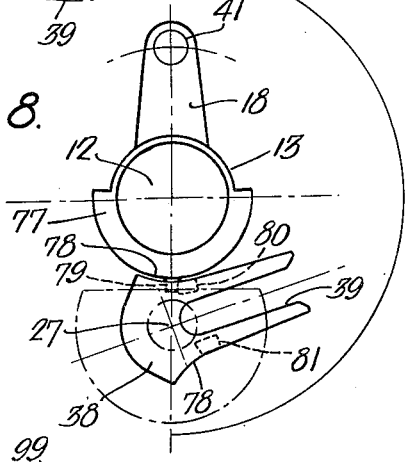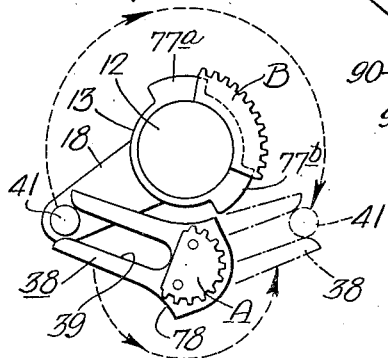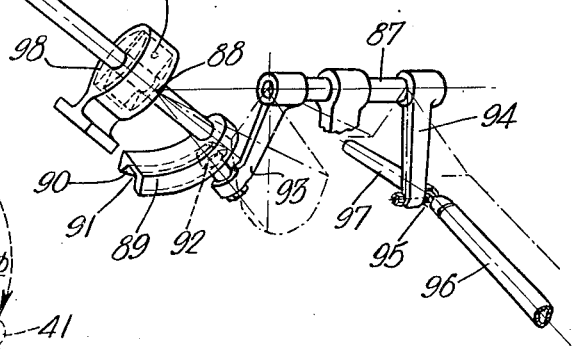

2,508,057

UNITED STATES PATENT OFFICE 2,508,057

APPARATUS FOR TRANSLATING, ACTUATING, AND RESTRAINING FORCES TO VEHICLE WHEELS

Arthur Ernest Joseph Bishop, Chatswood, near Sydney, New South Wales, Australia

Application December 3, 1947, Serial No. 789,346

15 Claims. (Cl. 244—50)

This invention relates to new and useful improvements in mechanisms for controlling the swivel wheel or wheels of aircraft or any other vehicle capable of being steered, and more particularly to improved mechanism for translating actuating or restraining forces from the source of actuation or restraint to the mounting of the swivel wheel or wheels which has a discriminatory action to provide greatly increased control when the aircraft or vehicle describes substantially a straight path.

In some prior embodiments of mechanisms of this type the application of power to swivel the wheel or wheels is effected by the use of hydraulic rams arranged at each side of the shock strut casing with their axes at right angles to and offset from the strut axis. Provision is made for connecting the pistons of the rams to a member journalled on the strut casing and means is provided for linking the rotational movement of this member to the wheel mounting in such a manner as to allow the wheel mounting to slide axially in the strut casing for the purpose of absorbing landing shocks. A valve is arranged to supply oil under pressure to these rams and is mechanically connected to both the steering device and the swivel wheel, so that the valve is inoperative except when they are relatively angularly displaced. In operation, when such relative displacement occurs, the valve opens to admit oil to the appropriate ram cylinder to force the swivel wheel once more to align with the steering device and the device is arranged so that the swivel wheel may caster when the steering device is not being operated and the rams supply the restraining force to suppress shimmy tendencies. This arrangement is often excessively weighty and cumbersome, and is so severe in operation that it is difficult to steer a straight path at medium speeds. At high speeds the wheel is easily over-steered, then over-corrected, resulting in excessive wear of the swivel wheel tires, and when sufficient power is provided to positively steer and control the wheel in the in-line position, it is found that excess loads may be applied to the undercarriage structure and airframe when the wheel is steered for a small radius of turn.

Another device that has been employed uses an hydraulic vane motor which is operable over a limited angle of travel. The shaft of this motor has an arm affixed thereto and a second arm, radial to the swivel wheel stock, is arranged to turn directly with turning movements of the stock. A link connects the ends of these arms so that operation of the vane motor causes the wheel to swivel or turn in a manner similar to that described in the first example.

In each of the above cases it is difficult to provide an angle of turn great enough to swing the aircraft, for example, about one main wheel. When it is desired to turn the wheel to a greater angle, as is often required, for example, when towing the aircraft by a drawbar attached to the swivel wheel, the steering device must be manually disconnected, to allow the wheel to turn past the steered limit without damaging the device. In all these cases the rate of movement of the power supplying element bears approximately the same relationship to the rate of swivel of the swivel wheel for all angles of turn of wheel.

The mechanism of the present invention is particularly applicable to aircraft or other vehicles which may be required to operate at high speeds in a substantially straight path, and where speed must be reduced considerably in comparison thereto in order to avoid excessive side loads on the wheel system, or other undesirable conditions, when curved paths are being described as a result of operation of the steering means. In such instances the steering or control means responds more critically to slight errors in judgment on the part of the person steering the vehicle, or to mechanical errors, slack, or loss of motion in the system, in the in-line position while moving at high speeds than towards the extremes of swivel of the wheel, and it is evident that it is desirable to introduce a high steering ratio, effective particularly in the in-line positon, between the steering means and the swivel wheel, that is, a mechanism wherein large movements of the steering means are associated with relatively small movements of the swivel wheel.

To this end the mechanism of the present invention provides a nearly uniform large steering ratio over a small range of movement near the in-line position, a rapidly decreasing steering ratio as the swivel wheel is turned to an intermediate angle, and a slight but still further decreasing steering ratio as swivelling continues to the condition of extreme angle of turn in either direction. Thus adequate control is provided in the in-line position, yet considerable turning movements may be made in the least time interval. Further, in the case of direct control by hand or by power steering, the relationship between steering movement and movement of the swivel wheel or wheels has a characteristic which simplifies maintaining the vehicle on a desired path and facilitates judging steered movements which will keep the vehicle in safe and stable equilibrium while performing curved paths. Specifically, the invention provides novel mechanism for steering or controlling the swivel wheel or wheels of aircraft and other vehicles, and is designed to provide for the many varying circumstances of operation in a more simple and direct manner than hitherto devised.

It is usually required that the pilot be able, at will, to steer the aircraft while landing, taxiing or maneuvering, either by operating an appropriate control which causes power to be supplied to swivel the wheel to the desired direction, or by operating the forward thrusting or retarding means on each side of the aircraft discriminatingly so as to cause the aircraft to turn and the swivel wheel to caster. In this latter instance, the swivel wheel must be sufficiently free to be able to turn or caster under the influence of the out of balance forces and yet have sufficient restraint to resist the tendency to violent oscillation known as shimmy. It is necessary, therefore, when these steering devices are not in operation, that they operate effectively to dampen oscillations of the wheel caused by the wheel striking some irregularity of the tarmac or airdrome surface and thereby prevent the occurrence of shimmy while at the same time allowing the wheel to caster freely as required for maneuvering the plane, and the mechanism of the present invention is superior in this respect to the prior devices previously described.

According to the present invention, the ratio between rate of movement of the power supplying element and the turn of the swivel wheel varies from a high ratio in the fore and aft position to a relative low ratio at the extreme angle of turn in both directions, and hence the control in line of flight is entirely sensitive and is not confused by the presence of slight mechanical backlash or lost movement in the operation of servo-mechanism. Furthermore, as the force or torque supplied by the active element is usually limited and effectively constant whether the means is activated by hydraulic, pneumatic or electric power, a condition is produced where the steering or controlling force at the swivel wheel varies, as the wheel turns, according to this same ratio. It may now easily be arranged so that away from the in-line position the force or torque transmitted to the wheel is sufficient to only partially swivel the wheel in opposition to excessive castering forces, so that while steering forces are still being supplied to turn the aircraft, the shock strut, wheels, and tires are protected from dangerous and overload conditions. This point is of particular significance with multi-engine aircraft when differential application of engine throttles or wheel brakes can apply very considerable steering forces to the swivel wheel particularly at the greater angles of turn. In the present invention, motion of the wheel beyond the steered limit automatically disengages the mechanism which remains inoperable while the swivel wheel may be towed without danger of structural damage to the steering device.

In addition, in the case of small aircraft, where steering of the swivel wheel is required and where it is desirable, for the sake of simplicity, to eliminate the separate cockpit steering control and connect directly to the rudder bar or other air borne directional control, the present invention provides an arrangement whereby the rudder may be safely "flicked" as often required by landing technique without causing a corresponding excess turning of the wheel. Again, shimmy damping may be provided in the in-line position by a relatively small damper, and the action of the movement disengages at the extremes of travel when the aircraft is maneuvered on the ground at extreme angles of turn.

With the foregoing in mind, the various features and details of the construction and operation of the present invention are hereinafter fully set forth and described with reference to the accompanying drawings, in which:

Fig. 1 is a perspective view of an airplane swivel wheel having a recoil movement associated with its stock and incorporating one embodiment of the present invention;

Fig. 2 is an enlarged fragmentary sectional elevation taken on line 2—2, Fig. 1;

Fig. 3 is a detached view in perspective of certain of the vane motor parts showing details of the construction and manner of assembly thereof;

Fig. 4 is a graph showing effective steering ratio of the mechanism in relation to angle of turn of the swivel wheel;

Figs. 5, 6, 7 and 8 are diagrammatic views in plan showing the relative positions of parts of the device for different turn positions of the swivel wheel;

Fig. 9 is a diagrammatic view showing a slightly modified form of the invention adapted to provide full rotation of the swivel wheel; and Fig. 10 is a view in perspective showing one application of the mechanism of the present invention to automobile steering.

With reference to the drawings, the present invention is illustrated in conjunction with the swivel wheel 10 of an aircraft. As shown in Fig. 1 the swivel wheel 10 is mounted in a fork 11 which has its tubular stock 12 rotationally and slidably mounted in a shock strut casing 13 that functions as a journal bearing for said stock and is fixed to an aircraft, either rigidly or retractibly, in well-known manner. Suitable bearings and seals 14 for the stock 12 are provided in the casing 13 as shown. The swivel wheel fork 11 has a bracket 15 rigid therewith, and to this bracket is pivoted one end of a link 16 which has its other end pivotally connected to a link 17 that, in turn, has its other end pivoted to a yoke 18. The yoke 18 rotates with the wheel fork 11 and swivel wheel 10, and is journalled in a bearing 19 provided circumferentially of the lower end of the strut casing 13 so that said yoke is free to rotate relative to said casing 13.

The strut casing 13 is provided with a bracket mounting portion 21 having a forwardly facing flat exterior surface which lies in a plane disposed at right angles to the fore and aft axis of the aircraft, and secured to this bracket 21, for example, by means of bolts 22, is a vane motor designated generally by the reference numeral 23. The vane motor 23 comprises a casing or cylinder member 24 of generally semi-circular horizontal cross-sectional shape having a bearing 25 in its underside and a relatively smaller bearing 26 in the upper side thereof arranged in coaxial alignment with the said bearing 25. Journalled in the lower bearing 25 is a shaft 27 which is provided with an enlarged circular head portion 28 that resides interiorly of the cylinder member 24 and is of such diameter that the peripheral surface of the said head portion engages the rear wall 29 of the cylinder member to provide a seal between opposite sides of the cylinder chamber. The shaft head 28 is provided with a diametrically arranged slot 30 therein having an outwardly declining or sloping bottom surface 31. This slot 30 is arranged to receive therein a floating vane 32 which is maintained in close sealing contact with the interior surface 33 of the cylindrical side wall portion of the cylinder member 24 by means of an expansion spring or the like 34 which has its opposite ends seated in sockets or recesses 35 and 36, respectively, provided in the shaft head portion 28 and the said vane 32 as shown, for example, in Figs. 2 and 3 of the drawings. This construction and arrangement of the shaft head portion 28 and the vane 32 provides for easy machining of these parts and affords optimum transmission of load to and from the vane 32 while allowing the periphery of the shaft head 28 to remain in sealing engagement with the rear wall 29 of the cylinder member 24 at all times.

The shaft 27 projects downwardly a short distance below the cylinder lower bearing 25 and fixedly secured upon the depending end portion thereof, for example, by means of a pin 37, is a radially extending arm 38. This arm 38 is provided in its under surface with a downwardly opening elongated radially extending slot 39 which is open at its outer end. The wall portions of the arm 38 at opposite sides of the outer open end of the slot 39 are flared or beveled outwardly, for example, as indicated at 40 in Figs. 1 and 2 of the drawings. Normally engaged within the elongated radial slot 39 in the arm 38 is a roller 41 which is rotatably mounted on the end of an upstanding pin or stud 42 that is fixedly secured in and carried by the aforesaid yoke 18 in diametrically spaced relation to the pivotal connection thereto of the link 17.

As shown in Figs. 2 and 3, the upper edge portion of the vane 32 is slotted as indicated at 45 to receive the tongued end 46 of a shaft 47 which is journalled in the aforesaid cylinder upper bearing 26. The shaft 47 has a spur gear 48 secured upon its upper end, and meshed with said gear 48 is a pinion 49 which is fixed upon the lower end of a stud shaft 50. This shaft 50 extends through and is carried by a radially extending arm or lever 51 which is secured upon the stem of a four-way valve 52, and fixed upon the upper end of said shaft 50 is a pinion 53 which, in turn, is meshed with a spur gear 54 arranged coaxially with respect to the aforesaid gear 48 and secured on the lower end of a steering shaft 55 which is rotatably supported in standards 56 and provided with a steering wheel or the line 57. The ratio of the spur gear 48 to the pinion 49 preferably is slightly greater than the ratio of the spur gear 54 to the pinion 53. Thus, for example, the ratio between the spur gear 48 and pinion 49 may be of the order of about 5 to 1 while the ratio between the spur gear 54 and pinion 53 may be of the order of about 4 to 1.

The four-way valve 52 is of conventional type which is operable to control the flow of oil or other hydraulic fluid from an inlet pipe 60 selectively through a pipe 61 or 62 to the interior of the vane motor cylinder member 24 at one side or the other of the floating vane 32 therein. As previously stated, the lever or arm 51 which carries the pinion shaft 50 is attached to the stem or rotor of this four-way valve 52 and the arrangement is such that when the arm 51 is moved clockwise from its neutral position x to the position y, oil from the pipe 60 is caused to flow through the pipe 61 interiorly of the vane motor cylinder 24 at the right hand side of the vane 32 therein and to exhaust from the cylinder at the opposite side of the vane 32 through the pipe 62 to an oil return pipe 64. The reverse action takes place when the lever 51 is moved in the counter-clockwise direction from its neutral position x to the position indicated at z.

The lever 51, and consequently the valve 52 normally are biased or urged to their neutral positions by means of springs 65 and 66 acting upon respectively opposite sides of the lever 51 as illustrated in Fig. 1 of the drawings. As shown in Fig. 1 of the drawings, the wheel 10 is in a relatively extreme swivel position in which it is disposed along a line 70 at an angle of approximately 50° with respect to a fore-and-aft center line 71, and the corresponding displacement of the vane 32 along line 72 is approximately 120°, while the position of the steering wheel 57 on line 73 is approximately 150°. With this relative positioning of the parts of the mechanism in mind, let us assume that the wheel 57 is rotated a few degrees in the counterclockwise direction. If this turning of the steering wheel 57 is not followed by a corresponding turn of the swivel wheel 10, rotation of the gear 54 will rotationally drive the pinions 53 and 49 causing them to precess around the axis of the gears 54 and 48 in the opposite direction and the ratio of the gear 54 to the pinion 53, for example, 4 to 1, will operate to cause the lever 51 and pinions 49 and 53 to move circumferentially about the axis of the gear 48 through an angle four times as great as the angle through which the steering wheel 57 is rotated. This precession of the pinions 53 and 49 causes the lever or arm 51 to be moved in the clockwise direction a distance corresponding to the angle of travel of the said pinions thereby partially opening the valve 52 to cause oil or other hydraulic fluid to be admitted through pipe 61 to the cylinder 24 at the right hand side of the vane 32 while oil at the opposite side of the vane is displaced thereby through the pipe 62 and valve 52 to the return line 64. The vane 32 is thus actuated in the counterclockwise direction with the result that the shaft 27 and arm 38 are correspondingly rotated in the same direction and the said arm 38 operating through the roller 41 causes the yoke 18, fork 11 and wheel 10 to be returned to or toward the in-line or centered position represented by the line 71 previously mentioned. The vane 32 will continue to move in the counterclockwise direction as described until the gear 48, which is moving in the counterclockwise direction, returns the lever 51 to its neutral position on line x thereby closing the valve 52 and interrupting the flow of oil through pipe 61 to the cylinder 24.

Apart from the positive steering operation just described, castering forces are acting continuously on the wheel 10 tending to caster the wheel and to permit this castering to occur a small orifice 75 is provided in the vane 32 to effect restricted passage of oil between opposite sides of the vane. In the event that the steering wheel 57 is not being held to a particular course or direction, the springs 65 and 66 function to transmit rotation of the gear 48 (caused by castering of the wheel 10) through the pinions 49 and 53 to the gear 54 and thence to the steering wheel without deflecting lever 51 sufficiently to operate the valve 52. On the other hand, if the steering wheel 57 is held while these castering forces on the wheel 10 are in operation, limited rotation of the vane 32 and gear 48 will continue to take place under the castering force until the lever 51 is deflected sufficiently to open the valve 52 enough to cause oil to flow to the cylinder 24 and through the vane orifice 75 in sufficient quantity to produce an equalizing force on the wheel 10 opposing the castering forces acting thereon.

Figs. 5, 6, 7 and 8 of the drawings illustrate diagrammatically the relative positions of the principal elements of the mechanism for various angular positions of the swivel wheel 10. Thus in Fig. 5, the mechanism is shown in the neutral or in-line position of the swivel wheel 10 and, since the spacing of the pivot axis of the wheel stock 12 from the axis of the roller 41 is several times (about 5) greater than the spacing of the vane axis therefrom, it will be apparent that a large steering ratio is provided in and immediately adjacent the in-line position of the swivel wheel 10, for example, as shown by the graph of Fig. 4. Furthermore, a comparison of the several turn positions of the mechanism indicated by the reference characters i, ii, iii and iv, illustrates clearly the manner in which movement of the vane motor arm 38 through four equal angles in clockwise direction with respect to Fig. 5 operates to rotate or turn the wheel stock 12 in the same direction through angular increments which progressively increase from an angle very much smaller than the angle of movement of the vane motor to an angle which is approximately equal to the corresponding angle of turn of the motor vane arm 38.

Fig. 6 of the drawings shows the relationship of the mechanism in one limit position of the vane motor with the roller 41 on the yoke 18 still in operative engagement with the arm slot 39, and Fig. 7 shows the relationship of the mechanism in the other limit position of the vane motor with the swivel wheel structure positioned so that the said roller 41 is no longer in operative engagement with the arm slot 39. In the illustrated embodiment of the present invention, the limit turn position of the vane motor and its arm 38 is at an angle $a$ of about 110° in either direction from the in-line position thereof, and although movement of the vane motor is thus limited, the swivel wheel 10 is free to continue to turn in either direction under the influence of the castering forces acting thereon.

In the form of the invention shown in Figs. 5, 6, 7 and 8 of the drawings, the wheel assembly is limited to rotation through an arc of 180° in either direction from the in-line position of Fig. 5 by means of a stop 79 on yoke 18 which is arranged to engage stops 80 and 81 provided on the vane arm 38, for example, as shown in Fig. 8 of the drawings. When the wheel 10 turns beyond the limit position of the vane motor the roller 41 moves endwise outwardly from the slot 39 in the vane motor arm 38 thereby disconnecting the vane motor from the wheel assembly so that the latter is free to turn without restriction. However, upon disengagement of the wheel assembly from the vane motor as described, it is necessary that the vane motor arm 38 be retained in the limit position ready to receive again the roller 41 of the wheel assembly when the latter returns to a position within the limit turn range of the vane motor and, according to the present invention, this is accomplished by providing cooperating stops on the yoke 18 and the vane arm 38. Thus, for example, there is provided circumferentially of the yoke 18 an arcuate portion or member 77 of predetermined extent which is adapted in the limit position of the vane arm 38 to move into cooperative association with a circular side edge portion 78 of said arm, as shown in Fig. 7, and thereby prevent rotation of the arm and vane motor from its limit position so long as the wheel assembly occupies a position at an angle to the in-line position greater than the limit angle of turn of the vane motor.

On the other hand, in cases where swivel of the wheel 10 is not limited as described and provision is to be made for full rotation of the wheel through a complete circle, it is necessary that the vane motor arm 38 be actuable from one limit position to the other in order that it may be in position to receive the roller 41 in its slot 39 when the wheel 10 moves into a position within the limit turn range of the vane motor at the opposite side of the in-line position in which the roller became disengaged from the arm. One arrangement for accomplishing this is shown in Fig. 9 of the drawings wherein gear segments A and B are provided on the arm 38 and on the wheel structure yoke 18 intermediate stop portions or members 77a and 77b, respectively, which latter are the functional counterpart of the portion or member 77 previously described. The gear segments A and B are of the same arcuate length and, should the wheel 10 caster in the direction of the arrow through a substantially complete circle of rotation, the gear segments will cooperate as shown to pivot the arm 38, for example, from the left hand limit position (solid lines) where the roller 41 to the other limit position (dotted lines) at the opposite side of the in-line position ready to receive the roller 41 in its slot 39 when the wheel has moved in the direction of the arrow to a position within the limited turn range of the vane motor.

With reference to Fig. 10 of the drawings the present invention is shown in conjunction with an automobile steering assembly comprising the usual steering wheel 85 and steering column 86. In this embodiment of the invention the axes of the steering column 86 and the shaft 87 intersect at a point 88 which lies on the former, and fixed to the lower end of the said steering column 86 is an arm 89 having a downwardly opening slot 90 therein. The slot 90 is constructed so that its base surface 91 lies on the surface of a sphere having the aforesaid point 88 as its center, and the side walls of the slot are tapered to conform to and receive therebetween a roller 92 of frusto-conical configuration. The roller is carried by an arm 93 which is fixed on the shaft 87, and also fixed on said shaft is an arm 94 which is pivotally connected through a common swivel joint 95 to the wheel radius rods 96 and 97.

In this application of the invention the roller 92 need not be disengaged from the slot 90 since movement of the arms 93, 94 and the shaft 87 generally may be limited to positions about 60° each side of the center or in-line position. Also, the arrangement operates to provide a high steering ratio in the in-line and immediately adjacent positions of the arm 89 with a rapidly decreasing steering ratio as the arm continues to move in either direction from said in-line position as previously described and shown in the graph of Fig. 4 of the drawings.

The steering column 86 may have an hydraulic damper 98 connected therein provided with a vane having an orifice 99 which is operable to minimize the transmission of road shocks to the steering wheel 85. Of course, a vane motor such as that previously described may be substituted for the shock absorber 98 and arranged to effect, or at least assist, in steering the vehicle.

The invention, of course, is susceptible of numerous other embodiments and adaptations, and while certain embodiments of the invention have been illustrated and described herein, it is not intended to limit the invention to such disclosures, and changes and modifications may be made therein and thereto within the scope of the following claims.

I claim:

1. Apparatus for translating actuating and restraining forces to a swivel wheel structure rotatably mounted in a relatively fixed bearing element, comprising a pivoted arm having a radial slot therein, actuating means operable to effect pivotal movement of said arm between predetermined limit positions equally spaced at opposite sides of a central in-line position, a member movable with said swivel wheel structure normally operable in the slot of said arm to transmit actuating and restraining forces from the latter to said wheel structure, the spacing of the pivot axis of the wheel structure from said member being substantially greater than the spacing of the pivot axis of the arm therefrom in the in-line arm position to provide a high force transmission ratio from the arm to the wheel structure in and adjacent the in-line position thereof and the difference in the spacing of said pivot axes decreasing substantially in positions of the arm progressively removed from said in-line position to provide a rapidly diminishing force transmission ratio terminating in a comparatively small transmission ratio as the arm approaches its limit positions.

2. Apparatus for translating actuating and restraining forces to a swivel wheel structure rotatably mounted in a relatively fixed bearing element, comprising a pivoted arm having a radial slot therein, power means operable to effect pivotal movement of said arm between predetermined limit positions equally spaced at opposite sides of a central in-line position, a member movable with said swivel wheel structure normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, and means carried by said wheel structure cooperable with said arm to predeterminedly position the same when the wheel structure is disposed at an angle from the in-line position thereof in which the said member is disengaged from said slot so that the arm is disposed to receive the member in its slot when the wheel is next disposed within the range of angular disposition thereof in which the member is engageable with the slot.

3. Apparatus for translating actuating and restraining forces to a swivel wheel structure rotatably mounted in a relatively fixed bearing element, comprising a pivoted arm having a radial slot therein, actuating means operable to effect pivotal movement of said arm between predetermined limit positions equally spaced at opposite sides of a central in-line position, a member movable with said swivel wheel structure normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, and means carried by said wheel structure and said arm cooperable to retain said arm in either of its limit positions when actuated thereto and to shift said arm between said limit positions according to the extent of rotational movement of said swivel wheel structure.

4. Apparatus for translating actuating and restraining forces to a swivel wheel structure rotatably mounted in a relatively fixed bearing element, comprising a pivoted arm having a radial slot therein, actuating means operable to effect pivotal movement of said arm between predetermined limit positions equally spaced at opposite sides of a central in-line position, a member movable with said swivel wheel structure normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, and stop means carried by said wheel structure and said arm cooperable to retain said arm in either of its limit positions when actuated thereto, and stop means associated with the stop means on said wheel structure engageable with means on said arm to shift the latter between said limit positions according to the extent of rotation of said swivel wheel structure.

5. Apparatus for translating actuating and restraining forces to a swivel wheel structure rotatably mounted in a relatively fixed bearing element, comprising a pivoted arm having an open-ended radial slot therein, power means operable to effect pivotal movement of said arm between predetermined limit positions equally spaced at opposite sides of a central in-line position, a pin movable with said swivel wheel structure normally operable in the slot of said arm to transmit actuating and restraining forces from the latter to said wheel structure, said arm and pin being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, stop means carried by said wheel structure and said arm cooperable to limit rotation of the wheel structure to a predetermined angle in either direction from said in-line position, and other stop means carried by said wheel structure cooperable with said arm in the limit positions thereof to retain the arm in said limit positions when the wheel structure is disposed at an angle from the in-line position thereof in which the pin is disengaged from said slot.

6. Apparatus for translating actuating and restraining forces to a swivel wheel structure rotatably mounted in a relatively fixed bearing element, comprising a pivoted arm having a radial slot therein, power means operable to effect pivotal movement of said arm between predetermined limit positions equally spaced at opposite sides of a central in-line position, a member carried by said swivel wheel structure normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, stop means carried by said wheel structure and said arm cooperable to limit rotation of the wheel structure to a predetermined angle in either direction from said in-line position, other stop means carried by said wheel structure cooperable with said arm in the limit positions thereof to retain the arm in said limit positions when the wheel structure is disposed at an angle from the in-line position thereof in which the roller means is disengaged from said slot, and means for controlling operation of said power means including a differential mechanism operable to multiply movements of said means to said power means.

7. Apparatus for translating actuating and restraining forces to a swivel wheel structure rotatably mounted in a fixed bearing element, a yoke rotatable on said bearing element and connected to said wheel structure for rotation therewith, a pivoted arm having a radial slot therein, power means operable to effect pivotal movement of said arm between predetermined limit positions equally spaced at opposite sides of a central in-line position, a member carried by said yoke normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, and stop means carried by said yoke cooperable with said arm in the limit positions thereof to retain the arm in said limit positions when the wheel structure is disposed at an angle from the in-line position thereof in which the member is disengaged from said slot.

8. Apparatus for translating actuating and restraining forces to a swivel wheel structure rotatably mounted in a fixed bearing element, a yoke rotatable on said bearing element and connected to said wheel structure for rotation therewith, a pivoted arm having a radial slot therein, power means operable to effect pivotal movement of said arm between predetermined limit positions equally spaced at opposite sides of a central in-line position, a member carried by said yoke normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, stop means carried by said yoke cooperable with said arm in the limit positions thereof to retain the arm in said limit positions when the wheel structure is disposed at an angle from the in-line position thereof in which the member is disengaged from said slot, and means for controlling operation of said power means including a differential mechanism operable to multiply movements of said means to said power means.

9. Apparatus for translating actuating and restraining forces to a swivel wheel structure rotatably mounted in a fixed bearing element, a yoke rotatable on said bearing element and connected to said wheel structure for rotation therewith, a pivoted arm having a radial slot therein, power means operable to effect pivotal movement of said arm between predetermined limit positions equally spaced at opposite sides of a central in-line position, a member carried by said yoke normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, stop means carried by said yoke and said arm cooperable to limit rotation of the wheel structure to a predetermined angle in either direction from said in-line position, and other stop means carried by said yoke cooperable with said arm in the limit positions thereof to retain the arm in said limit positions when the wheel structure is disposed at an angle from the in-line position thereof in which the member is disengaged from said slot.

10. Apparatus for translating actuating and restraining forces to a swivel wheel structure rotatably mounted in a fixed bearing element, a yoke rotatable on said bearing element and connected to said wheel structure for rotation therewith, a pivoted arm having a radial slot therein, power means operable to effect pivotal movement of said arm between predetermined limit positions equally spaced at opposite sides of a central in-line position, a member carried by said yoke normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, stop means carried by said yoke and said arm cooperable to limit rotation of the wheel structure to a predetermined angle in either direction from said in-line position, other stop means carried by said yoke cooperable with said arm in the limit positions thereof to retain the arm in said limit positions when the wheel structure is disposed at an angle from the in-line position thereof in which the member is disengaged from said slot, and means for controlling operation of said power means.

11. Apparatus for translating actuating and restraining forces to a swivel wheel structure rotatably mounted in a fixed bearing element, a yoke rotatable on said bearing element and connected to said wheel structure for rotation therewith, a pivoted arm having an open-ended radial slot therein, power means operable to effect pivotal movement of said arm between predetermined limit positions equally spaced at opposite sides of a central in-line position, roller means carried by said swivel wheel structure normally operable in the slot of said arm to transmit actuating and restraining forces from the latter to said wheel structure, said arm and roller means being constructed and arranged to provide a high force transmission ratio from the arm to the wheel structure in and adjacent the in-line position thereof and in positions of the arm progressively removed from said in-line position to provide a rapidly decreasing force transmission ratio termnating in a comparatively small transmission ratio as the arm approaches its limit positions, stop means carried by said yoke and said arm cooperable to limit rotation of the wheel structure to a predetermined angle in either direction from said in-line position, other stop means carried by said yoke cooperable with said arm in the limit positions thereof to retain the arm in said limit positions when the wheel structure is disposed at an angle from the in-line position thereof in which the roller means is disengaged from said slot, and manual means for actuating said power means including a differential mechanism operable to multiply movements of said manual means to said power means.

12. Apparatus for translating actuating and restraining forces to a swivel wheel structure rotatably mounted in a relatively fixed bearing element, comprising a pivoted arm having a radial slot therein, actuating means operable to effect pivotal movement of said arm between predetermined limit positions equally spaced at opposite sides of a central in-line position, a member movable with said swivel wheel structure normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, stop means carried by said wheel structure and said arm cooperable to retain said arm in either of its limit positions when actuated thereto, and means on said swivel wheel structure and arm comprising corresponding gear segments operable to shift the latter between said limit positions according to the extent of rotation of said swivel wheel structure.

13. Apparatus for translating actuating and restraining forces to a swivel wheel structure rotatably mounted in a relatively fixed bearing element, comprising a pivoted arm having a radial slot therein, power means operable to effect pivotal movement of said arm between predetermined limit positions equally spaced at opposite sides of a central in-line position, a member carried by said swivel wheel structure normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, stop means carried by said wheel structure and said arm cooperable to retain said arm in either of its limit positions when actuated thereto, means associated with the stop means on said wheel structure engageable with means on said arm to shift the latter between said limit positions according to the extent of rotation of said swivel wheel structure, and means for controlling operation of said power means including a differential mechanism operable to multiply movements of said means to said power means.

14. Apparatus for translating actuating and restraining forces to a swivel wheel structure rotatably mounted in a fixed bearing element, a yoke rotatable on said bearing element and connected to said wheel structure for rotation therewith, a pivoted arm having a radial slot therein, power means operable to effect pivotal movement of said arm between predetermined limit positions equally spaced at opposite sides of a central in-line position, a member carried by said yoke normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, means associated with said wheel structure and said arm cooperable to retain the latter in either of its limit positions when actuated thereto and to shift said arm between said limit positions according to the extent of rotation of said swivel wheel structure, and means for controlling operation of said power means including a differential mechanism operable to multiply movements of said means to said power means.

15. Apparatus for translating actuating and restraining forces to a swivel wheel structure rotatably mounted in a fixed bearing element, a yoke rotatable on said bearing element and connected to said wheel structure for rotation therewith, a pivoted arm having a radial slot therein, power means operable to effect pivotal movement of said arm between predetermined limit positions equally spaced at opposite sides of a central in-line position, a member carried by said yoke normally operable in the slot of said arm to transmit actuating and restraining forces from the latter to said wheel structure, said arm and member being constructed and arranged to provide a high force transmission ratio from the arm to the wheel structure in and adjacent the in-line position thereof and in positions of the arm progressively removed from said in-line position to provide a rapidly decreasing force transmission ratio terminating in a comparatively small transmission ratio as the arm approaches its limit positions, stop means carried by said wheel structure and said arm cooperable to retain said arm in either of its limit positions when actuated thereto, and means on said swivel wheel structure and arm comprising corresponding gear segments operable to shift the latter between said limit positions according to the extent of rotation of said swivel wheel structure.

ARTHUR ERNEST JOSEPH BISHOP.

REFERENCES CITED

The following references are of record in the file of this patent:

UNITED STATES PATENTS

| Number | Name | Date |
|---|---|---|
| 692,879 | Lemp | Feb. 11, 1902 |
| 1,859,333 | Josephs | May 24, 1932 |
| 1,910,600 | Fitch | May 23, 1933 |
| 2,199,966 | Timm | May 7, 1940 |
| 2,372,710 | Chisholm | Apr. 3, 1945 |

FOREIGN PATENTS

| Number | Country | Date |
|---|---|---|
| 545,943 | Great Britain | June 19, 1942 |